United States Patent [19]

Perkins

[11] Patent Number: 4,680,891
[45] Date of Patent: Jul. 21, 1987

[54] DOOR HYDRAULIC ARRANGEMENT

[75] Inventor: John W. Perkins, Hialeah, Fla.

[73] Assignee: Monarch Aviation, Inc., Miami, Fla.

[21] Appl. No.: 879,803

[22] Filed: Jun. 27, 1986

[51] Int. Cl.$^4$ .............................................. E05F 15/00
[52] U.S. Cl. .................................. 49/280; 244/129.5;
49/395
[58] Field of Search ......................... 49/280, 264, 395;
244/129.5

[56] References Cited

U.S. PATENT DOCUMENTS 3,718,171  2/1973  Godwin ........................ 244/129.5 X
4,473,201  9/1984  Barnes et al. ..................... 49/280 X Primary Examiner—Kenneth Downey
Attorney, Agent, or Firm—Richard M. Saccocio

[57] ABSTRACT

Electrically-operated hydraulic and mechanical apparatus is disclosed for opening and closing a large door, for example, on a cargo airplane. Door latching or locking apparatus is also disclosed, which serves to prevent the door from being inadvertently opened at any time. The hydraulic and mechanical apparatus are sequentially activated so that, for example, before the door latching operation can begin, full closing of the door is required. Conversely, before opening of the door can occur, full unlatching of the latching mechanism must first occur.

7 Claims, 2 Drawing Figures

DOOR HYDRAULIC ARRANGEMENT

CROSS-REFERENCE TO RELATED APPLICATIONS

This application is related to co-pending patent application Ser. No. 879,801, filed June 27, 1986, entitled "Hydraulic Switch" by John W. Perkins, which is assigned to Monarch Aviation, Inc., and which application is being filed concurrently herewith.

BACKGROUND OF THE INVENTION

1. Field of the Invention

This invention pertains, in general, to the field of hydraulic actuating systems and, in particular, to an arrangement whereby hydraulics are used to control the sequencing of and operation of mechanical actuating apparatus as applied to the opening, closing and latching of a large door.

2. Description of the Prior Art

Hydraulic actuating systems have, of course, been used in the past for purposes of opening and closing doors and the like. This includes sequencing of the operations involved whereby door unlocking apparatus is actuated followed by door opening and then locking of the door in the open position. Such sequencing also accomplishes a reverse procedure whereby the door is closed and then locked in a closed position.

In the past, such systems have involved complicated combinations of electrical systems, hydraulic systems, and mechanical systems. In general, complicated systems tend to be unreliable. Unreliability of such systems as applied to, for example, large cargo doors on airplanes cannot be tolerated and therefore require a backup system. Backup systems are problematic in themselves, in that, they too are often complicated and, therefore, unreliable. Moreover, backup systems are less frequently required to be operated as compared to the main system. Infrequent operation can also lead to system failure. Therefore, as applied to airplane cargo doors, a prime objective of any system is high or increased reliability and, accordingly, is an object of the present invention.

A simple and reliable backup system is yet another object of the present invention.

A further object of the present invention is to provide a mechanical arrangement which works in conjunction with a hydraulic system and which is simple but yet effective to securely latch the door in a closed position in order to prevent accidental or inadvertent opening thereof when the airplane is in flight.

An even further object of the present invention is to provide a combination hydraulic and mechanical arrangement whereby a cargo door which is both large and heavy may be securely locked in an open position in order to prevent accidental closing thereof.

The above-stated objects as well as other objects which although not specifically stated, but are intended to be included within the scope of the present invention, are accomplished by the present invention.

SUMMARY OF THE INVENTION

The above objects, as well as others, are accomplished by the present invention which comprises an electrically-operated hydraulic actuating system in conjunction with a mechanical arrangement as applied to a large and heavy cargo door of an airplane.

The mechanical system includes a plurality of latch mechanisms which securely lock the door in a closed position. Mechanical locking pins are utilized to lock the latch mechanisms when the latches are in a locking mode of operation. Hydraulic cylinders in combination with a hinge and lever arms are used to rotate the door during opening and closing thereof.

A hydraulic system actuated by cams and microswitches is utilized to sequence the mechanical operations of the latch locking members, opening of the latch mechanisms, and then opening of the door. The hydraulic system also provides for the reverse sequence of operation of the door and the latching and locking members during the closing of the door. The hydraulic system further provides for locking of the door at any desired or predetermined open position of the door.

The hydraulic system may be actuated by electrical means or manual means. The electrical means provides the primary source of energy utilized in the operation of the hydraulic pump which supplies the pressurized fluid to the various sequencing valves, lock valves, and the operating cylinders which activate the mechanical door latching, opening and closing arrangement. Backup for the hydraulic pump is provided for by the capability of manually operating a hydraulic pump. A separate, low voltage, DC electrical system is utilized to energize and operate the various microswitches which serve to sequentially provide for prearranged operation of the hydraulic and mechanical systems.

Various other objects, advantages and features of the invention will become apparent to those skilled in the art from the following discussion taken in conjunction with the following drawings, in which:

DESCRIPTION OF THE PREFERRED EMBODIMENTS

Figure 1:
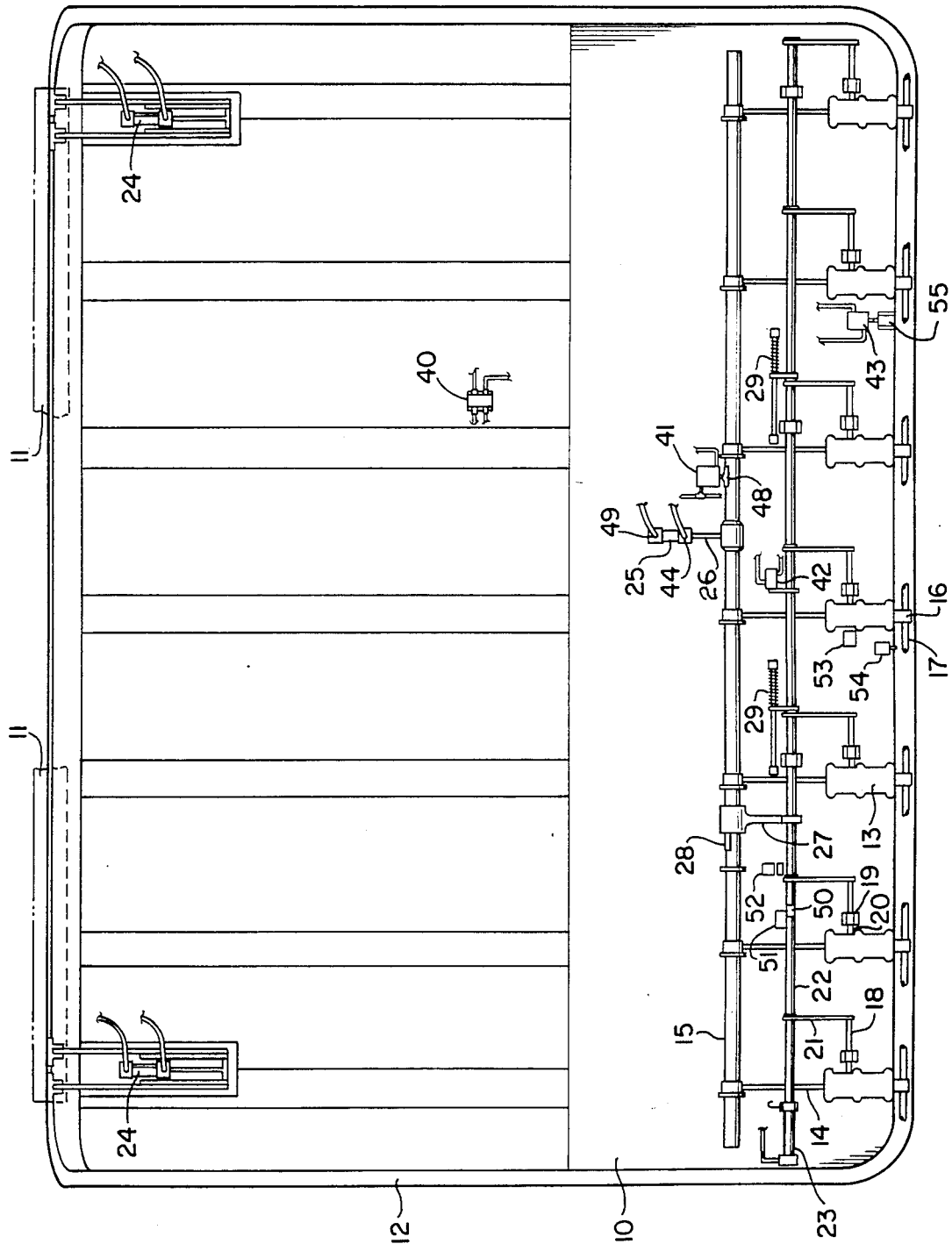
FIG. 1 is a schematic plan view of the mechanical arrangement as provided for by the invention in combination with the actuating components of the hydraulic system; and, FIG. 2 is a schematic plan view of the hydraulic system as provided for by the present invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings wherein like characteristics and features of the present invention shown in the various figures are designated by the same reference numerals.

Figure 2:
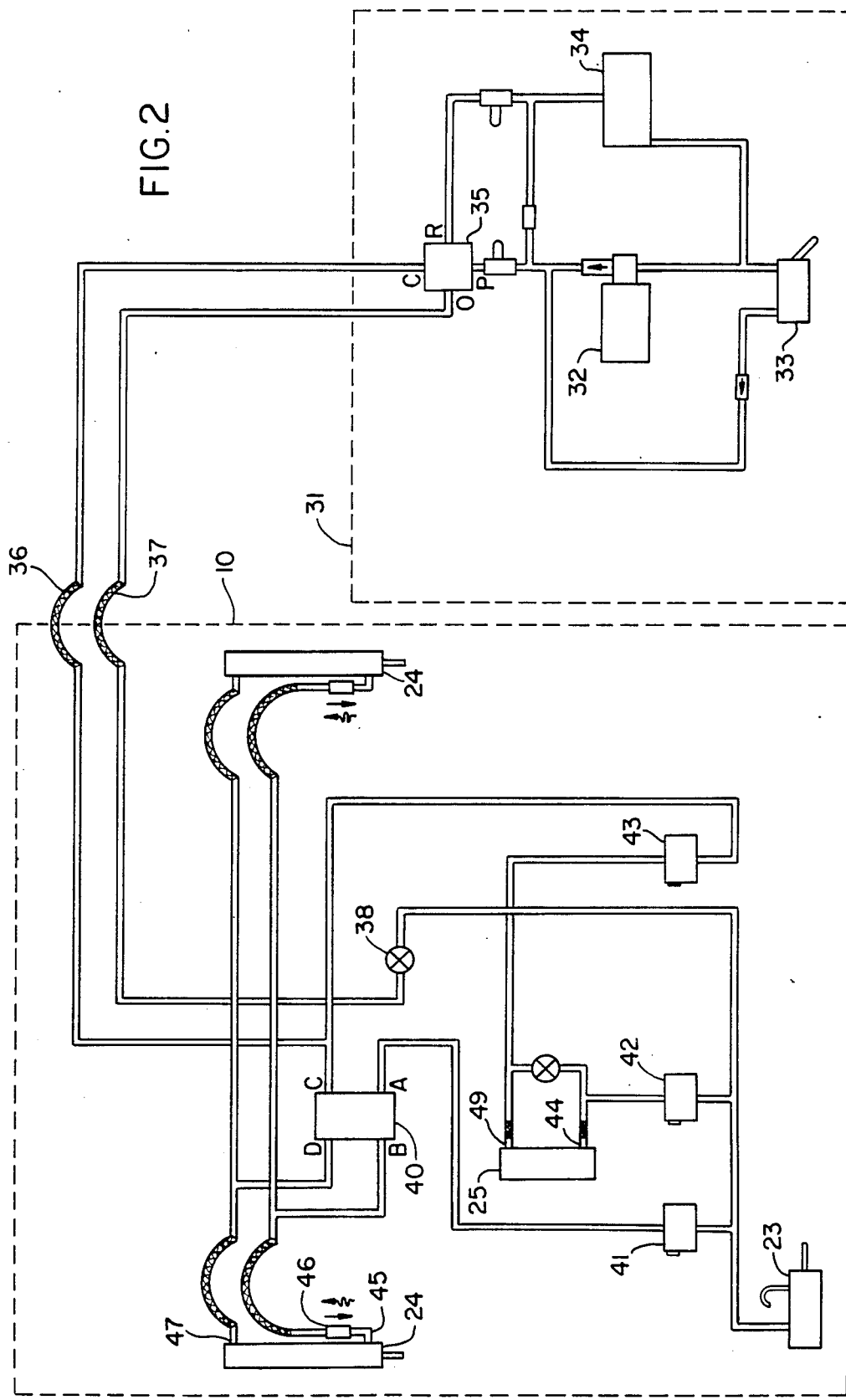

Although FIGS. 1 and 2 separately illustrate the mechanical and hydraulic systems respectively, it is to be understood that both systems are fitted together on, for example, the cargo door of an airplane. The separate rendering of the mechanical and hydraulic systems is only for purposes of convenience and clarity and in aiding the understanding of the description which follows. Moreover, schematic renderings are utilized, in that, the various hydraulic hose types and connections as well as some of the details of the mechanical apparatus are not particularly germane to the invention.

The mechanical arrangement shown in FIG. 1 may be viewed as being attached to a cargo door of an airplane which is being viewed from the inside thereof. The door opens by swinging out from the bottom rotating around hinges at the upper end of the door. Door 10 then is provided with hinges 11 at the upper and side ends thereof. Door 10 is designed such that when fully closed, the outside surface thereof is flush with the outside surface of the airplane. Accordingly, flange 12 exists around the entire periphery of door 10. The portion of door 10 within flange 12 is raised by means of structural components such as various shaped beams. These beams, however, are not shown. Such beams do provide the means by which the mechanical, hydraulic and electrical components of the present invention may be attached to door 10. Such connection or methods thereof are not considered important. Door hinges 11 are actuated by means of hydraulic cylinders 24.

A plurality of latches 13 are arranged at the lower inside edge of door 10. Latches 13 serve to physically latch door 10 to the body of the airplane when door 10 is closed. Each latch 13 includes a linkage arrangement 14 which transmits rotational motion of torque tube 15 to a latch arm which hooks over latch bar 17 which is attached to the body of the airplane.

Linkage arrangement 14 is activated by means of rotation of torque tube 15. Torque tube 15 comprises an elongated bar, which may be hollow, having linkage arms attached thereto along the length thereof at the locations of latches 13. Torque tube 15 is appropriately and securely connected to door 10 such that it may be rotated about its longitudinal axis. Torque tube 15 is actuated by means of a hydraulic cylinder 25 comprising a latch actuating cylinder which is attached to one end of linkage arrangement 14. The latch arm 16 is attached to the other end of linkage 14.

In order to prevent inadvertent opening of latches 13 and to provide a positive locking arrangement, latch pins 18 are used to lock linkage 14 when the door 10 is fully closed and latched. Latch pins 18 are guided by and slide within an opening in latch pin plates 19. As may be seen in FIG. 1, latch pins 18 are positioned perpendicularly to latches 13 and linkage 14. When latches 13 are in their latched position, an opening 20 through the body of latches 13 and of linkage 14 is aligned with the opening through latch pin plate 19 and with latch pins 18. When such alignment occurs, latch pins 18 may be slide within openings 20 and thereby positively lock the same in a latched position. Latch pins 18 are immediately actuated by arms 21, each of which is attached at one end to latch pin 18 and at its other end to slide bar 22. Slide bar 22, it may be seen, is oriented substantially parallel to torque tube 15 but is spaced therefrom by and appropriate distance. Slide bar 22 moves horizontally in right and left directions (fore and aft relative to an airplane). In so doing, latch pins 18 engage with and disengage from latches 13. A hydraulic cylinder 23 attached to one end of slide bar 22 provides for such horizontal motion.

It is imperative that latch pins 18 engage with latches 13 only when latch arms 16 are fully latched around bar 17 and thusly, when door 10 is fully closed. Accordingly, torque tube 15 and slide bar 22 are mechanically interconnected by means of arm 27 which prevents motion of slide bar 22 except when door 10 is latched closed. Arm 27 is fixedly attached at one end to slide bar 22; the other end of arm 27 is hollow such that torque tube 15 extends therethrough. In this manner, torque tube 15 may rotate within and without interference from arm 27. When torque tube 15 is rotated such that latch arms 16 are fully in their latching position, an opening within the cylindrical bore in arm 17 becomes aligned with cam 28. When such alignment occurs, cam 28 may slide within the opening in the bore of arm 27 and, thusly, allows horizontal motion of slide bar 22 which causes latch pins 18 to engage with latches 13. Conversely, slide bar 22 is allowed to move horizontally to the right whereby latch pins 18 disengage from latches 13, only when cam 28 is aligned with the opening in arm 27. This arrangement allows pin 18 engagement only when torque tube 15 is rotated to a particular position which corresponds to latch arms 16 being latched to bars 17. It is to be noted that hydraulic cylinder 23 only provides for the disengagement motion of pins 18 with respect to latches 13. Springs 29 provide for the movement of slide bar 22 to result in engagement of pins 18 with latches 13. Springs 29 comprise a compression spring which is compressed by the disengagement actuating force of hydraulic cylinder 23. The engagement action of spring 29 is automatic only when cam 28 is aligned with the opening within arm 27 which, of course, corresponds to the fully latched position of latches 13.

Door opening hydraulic cylinders 24, torque tube actuating cylinder 25, and cylinder 23 which provides for latch pin disengagement are each actuated by the hydraulic system shown in FIG. 2 of the drawings. Referring now to FIG. 2, the hydraulic system shown therein and bounded by the dashed line designated by numeral 10, which physically corresponds to door 10. The portion of the hydraulic system bounded by the dashed line designated by the numeral 31, is attached to or located on a bulkhead within the airplane. Accordingly, the door opening, closing and latching functions are controlled by the control panel located on bulkhead 31.

Bulkhead 31 includes an electrically-operated hydraulic pump 32, a backup hand pump 33, a hydraulic reservoir 34, and a selector valve 35. Backup hand pump 33 provides for all of the hydraulic actuating functions of the door opening, closing and latching systems in the event that there is an electrical failure which renders hydraulic pump 32 inoperable. Selector valve 35 has four ports, namely: P, R, C, and O. When port P is connected to O, and R is connected to C, selector valve 35 is in the door open position. When ports P and C, and R and O are connected, respectively, selector valve 35 is in the door closed position. Selector valve 35 may be appropriately positioned by either electrical means or by manual means. Such mode of operation is consistent with the capability of the arrangement disclosed herein to open and close the door 10 even during loss of electrical power conditions.

Hydraulic tubing from port C and from port O extends from the bulkhead 31 to the cargo door 10. Short lengths of flexible hydraulic tubing 36 and 37 provide for hydraulic connection while allowing door motion. All non-flexible lines within the hydraulic system may comprise appropriately-sized and -rated stainless steel tubing.

A lock valve 40 and three sequencing valves or hydraulic switches comprising: a door open sequence valve 41, a latch open sequence valve 42, and a latch close sequence valve 43, which direct hydraulic fluid to various hydraulic actuators are located on the cargo door 10.

In order to open door 10, selector valve 35 is positioned with ports P and O being connected to sequentially direct the flow of pressurized hydraulic fluid from hydraulic pump 32 to the sequencing valves and operating cylinders, while ports C and R are connected to direct the return flow of hydraulic fluid from the operating cylinders to reservoir 34. Accordingly, pressurized hydraulic fluid is first directed through an isolation valve 38, which is normally open, to latch pin unlocking cylinder 23. This causes slide bar 22 (FIG. 1) to move horizontally to the right which causes disengagement of latch pins 18 from latches 13 and simultaneously causes compression of slide bar compression springs 29 and disengagement of cam 28 from arm 27. The hydraulic pressure through selector valve 35 simultaneously acts upon and actuates the latch open sequence valve 42. It is to be noted at this time that sequencing valves 41, 42, and 43 comprise hydraulic switches as described and claimed in my co-pending patent application Ser. No. 879,801, entitled "Hydraulic Switch," filed June 27, 1986. Latch open sequence valve 42 opens due to the hydraulic pressure applied and supplies pressure to the open port 44 of latch actuating cylinder 25. Latch actuating cylinder 25 activates linkage arrangement 26 which causes torque tube 15 to rotate and withdraw latch arms 16 from their latched position around bars 17. Torque tube 15 rotation, however, does not occur until pins 18 are fully disengaged from latches 13. The cam 28 on torque tube 15 rotates with torque tube 15 causing misalignment with the opening in arm 27, thereby preventing left-to-right motion of slide bar 22 and the re-engagement of latch pins 18. This keeps springs 29 in a compressed mode. In the meantime, another cam 48 on torque tube 15, which also rotates with torque tube 15, when latch arms 16 are disengaged, mechanically actuates the door open sequence valve 41. Hydraulic flow through the door open sequence valve 41 supplies pressure to port A of lock valve 40. The pressure at port A internally connects port A with B, and C with D, which corresponds to a door opening arrangement of lock valve 40. Such positioning of lock valve 40 causes actuation of door actuating cylinder 24, thereby opening the door to a full open position. Flow-through ports A and B allow the pressurized fluid to flow through restrictor check valve 46 to port 45 of door actuating cylinder 24. With the flow in this direction, the flow through restrictor check valve 46 is not restricted. As a result, the piston of cylinder 24 is withdrawn into cylinders 24, causing door 10 to hinge open by appropriate linkages connected to the door and the frame of the airplane. The return flow of fluid from cylinders 24 goes through port 47, through ports D and C, and to reservoir 34.

In the inventive arrangement, the opening of door 10 continues while the electrical switch operating hydraulic pump 32 continues to be "on." At any time during the opening sequence, when the electrical switch to hydraulic pump 32 is released and thereby returns to the "off" position, door 10 will stop from being opened any further. Then, it will be maintained in the open position attained at the time the hydraulic pump is turned off. This feature is accomplished by lock valve 40 which upon sensing a zero pressure at port A causes isolation of ports B and D, thereby retaining the then present hydraulic fluid in door actuating cylinder 24 which prevents any further motion of door actuating cylinder 24.

The following sequence describes the closing of door 10. Selector valve 35 is positioned such that port P is connected to port C and port O is connected to port R. With the hydraulic pump 32 "on," hydraulic pressure through port P and C of selector valve 35 is ducted to port C of lock valve 40. This opens pressure and return ports of lock valve 40. That is, port C is connected to port O and port A is connected to port B. In this instance, then, the hydraulic pressure is routed to port 47 of door actuating cylinder 24. This causes door actuating cylinder to operate in the reverse direction as that described above, thereby closing the door 10. The restrictor check valve 46 located at the return port 45 of door actuating cylinder 24, restricts the rate of return flow of fluid preventing closing of door 10 too fast. It is to be noted, that when the door 10 is being opened, restrictor check valve 46 allows unrestricted flow into port 45.

When door 10 reaches the closed position, a sensor 55 (see FIG. 1) attached to the lower edge of door 10 is actuated, which applies motion to the mechanical plunger of latch closed sequence valve 43. This actuates sequence valve 43 allowing flow of hydraulic fluid in a direction opposite to its normal flow when operating as a check valve. This, in turn, supplies hydraulic pressure to the close port 49 of latch actuator cylinder 25. The latch actuator cylinder 25 rotates torque tube 15 in a direction which moves latch arms 16 of latches 13 around anchor bars 17 so as to latch the door 10 in the closed position.

Cam 28 rotates with torque tube 15 when torque tube 15 is being actuated by the latch actuating cylinder 25 during the closing sequence. Upon alignment of cam 28 with the opening within the bore of arm 27, springs 29, which were previously compressed during the door opening sequence, push slide bar 22 horizontally to the left of the position shown in FIG. 1. During such motion, the opening within arm 27 telescopes over cam 28 while latch pins 18 engage with latches 13 and latch arms 16, thereby latching or locking latch arms 16 in a latched position.

Since the hydraulic pump 32 is still on during the latching sequence, there comes a time when it is desirous of automatically shutting down the hydraulic pump and overriding the manually-operated switch which activates the hydraulic pump 32. This is accomplished by a cam 50 on slide bar 22 which when it moves to the left contacts a microswitch 51 which shuts off the electricity to the hydraulic pump 32. In this manner, the operator can continue to hold the electric switch for the hydraulic pump 32 in the "on" position until such time as microswitch 51 automatically terminates the operation of hydraulic pump 32.

When the slide bar 22 moves left engaging latch pins 18 with latches 13, a microswitch 52 is actuated by such motion which causes a light on the electrical control panel to give a visual indication that the latching operation is complete. When the latch pins 18 engage the latches 13, another microswitch 53 is actuated which extinguishes a lock pin light also located on the control panel 31. Previously, as the door 10 was being closed, a cam on the lower door jamb actuates a microswitch 54 which extinguishes a door warning light on the electrical control panel 31. The door is now down and locked. A visual indicator located on the lower edge of the door 10 is visible from the outside of the door 10 and indicates when door 10 is fully latched by latch pins 18. The visual indicator may comprise a see-through port which when latch pins 18 are fully inserted within latches 13, a line appears within the viewing port at a position located at the vertical diametrical line of the viewing port. Such line may be inscribed upon an appropriate component associated with the movement of slide bar 22.

While the invention has been described, disclosed, illustrated and shown in certain terms or certain embodiments or modifications which is has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim as my invention:

1. A hydraulically-operated mechanical arrangement for sequentially unlocking, unlatching and opening a panel covering an opening in a wall of a structure comprising
    latch means for latching said panel to the opening of said structure when said panel is in a closed and latched position and for unlatching said panel when said panel is to be opened
    pin means for locking said latch means when said panel is in a closed latched position and for unlocking said latch means when said panel is to be opened
    hydraulic pump means for pressurizing a hydraulic fluid
    a hydraulic cylinder for disengaging said pin means from said latch means
    a latch open sequence valve comprising a first hydraulic switch
    a hydraulic cylinder for operating said latch means in an unlatching mode
    a panel open sequence valve comprising a second hydraulic switch
    a hydraulic cylinder for opening said panel, and
    hydraulic conduit connecting said sequence valves and said cylinders to said hydraulic pump means.

2. A hydraulically-operated mechanical arrangement for sequentially closing, latching and locking a panel covering an opening in a wall of a structure comprising
    latch means for latching said panel to the opening of said structure when said panel is in a closed and latched position and for unlatching said panel when said panel is to be opened
    pin means for locking said latch means when said panel is in a closed latched position and for unlocking said latch means when said panel is to be opened
    hydraulic pump means for pressurizing a hydraulic fluid
    a hydraulic cylinder for closing said panel
    a latch close sequence valve comprising a hydraulic switch
    a hydraulic cylinder for operating said latch means
    means for engaging said pin means with said latch means
    means for sequentially operating said engagement of said pin means with said latch means after operation of said latch means, and
    hydraulic conduit connecting said sequence valves and said cylinders to said hydraulic pump means.

3. The apparatus of claim 1, including a lock valve for hydraulically isolating said cylinder for opening said panel in any position whereby said panel remains fixed at any position between full closed and full opened.

4. The apparatus of claim 2, including a restrictor check valve located at the outlet port of said hydraulic cylinder for closing said panel whereby said panel is closed at a predetermined rate of speed.

5. The apparatus of claim 1, including a selector valve whereby the opening or closing sequence of said panel is selected.

6. The apparatus of claim 2, including a selector valve whereby the closing or opening of said panel is selected.

7. The apparatus of claim 1, wherein said latching mechanism comprises a plurality of latches located at the bottom edge of said panel, said latches including a latching member whereby an anchor member attached to said structure is engaged by said latching member.

* * * * *